United States Patent [19]
Mazzarins

[11] 3,801,164
[45] Apr. 2, 1974

[54] TRACTION DEVICE FOR RUBBER-TIRED VEHICLE

[75] Inventor: Janis Mazzarins, Macedonia, Ohio

[73] Assignee: General Motors Corporation, Detroit, Mich.

[22] Filed: Nov. 6, 1972

[21] Appl. No.: 304,080

[52] U.S. Cl. .................................. 305/23, 305/30
[51] Int. Cl. .......................................... B62d 55/04
[58] Field of Search ............ 305/23, 25, 32, 29, 30; 180/9.5, 9.52

[56] References Cited
UNITED STATES PATENTS
2,426,342  8/1947  Couse ................................ 180/9.52

FOREIGN PATENTS OR APPLICATIONS
21,560   8/1920   France ................................. 305/23
93,942   3/1959   Norway ............................... 180/9.5
58,903   12/1922  Sweden ................................ 305/23

*Primary Examiner*—Richard J. Johnson
*Attorney, Agent, or Firm*—Edward J. Biskup

[57] ABSTRACT

A traction device which includes a pair of guide rollers that are combined with a rubber tire and an endless track and are interconnected by adjustment means which serve to reposition one guide roller relative to the other so as to vary the extent of track available for ground contact.

3 Claims, 3 Drawing Figures

PATENTED APR 2 1974　　　　　　　　3,801,164

TRACTION DEVICE FOR RUBBER-TIRED VEHICLE

During the past several years the four-wheel drive rubber-tired tractor has become a substantial factor in earthmoving operations. Its most successful application is as a front-end loader for loading trucks or hoppers, however, it has also been used for excavating, cleanup and other material handling work. The large pneumatic tires used with the tractor permits it to be driven at a higher rate of speed and prevent it from causing any substantial damage to the surface over which it moves. It is a recognized fact, however, that rubber-tired tractors do not enjoy the traction crawler tractors have particularly when used on soft ground or under muddy soil conditions.

Accordingly, the objects of the present invention are to provide a traction device for a rubber-tired vehicle that improves the flotation ability of the tires; to provide a traction device which includes a pair of roller supporting arms that are combined with a rubber tire and an endless track and are interconnected by adjustment means which serve to adjust the position of one arm relative to the other so as to vary the extent of track available for ground contact; to provide an adjustable tensioning arrangement for an endless track that is combined with a rubber tire and includes guide rollers located on opposite sides of the tire; and to provide an axle housing supported traction device that includes oppositely extending arms each of which carries a guide roller which together with a rubber tire serves as a support for an endless track.

The above objects and others are realized in accordance with the invention by a traction device which is combined with an axle housing of an off-highway vehicle. A driven wheel which carries a rubber tire is mounted at each end of the axle housing and a pair of arms are supported by the axle housing adjacent to and inboard of the rubber tire. Each arm extends outwardly along an axis perpendicular to the longitudinal axis of the axle housing and in a direction opposite to the other arm. A guide roller is rotatably carried by the free end of each arm adjacent the tire and in longitudinal alignment therewith so as to permit a flexible track to be entrained about the rollers and the rubber tire and provide a substantially flat lower track section for engaging the ground and serving as traction means. In addition, adjustment means are provided above and below the axle housing for interconnecting the arms and permitting one arm to be adjustably positioned relative to the other arm so as to vary the extent of the lower track section available for ground contact.

Other objects and advantages of the present invention will be apparent from the following detailed description when taken with the drawings in which.

Figure 1:
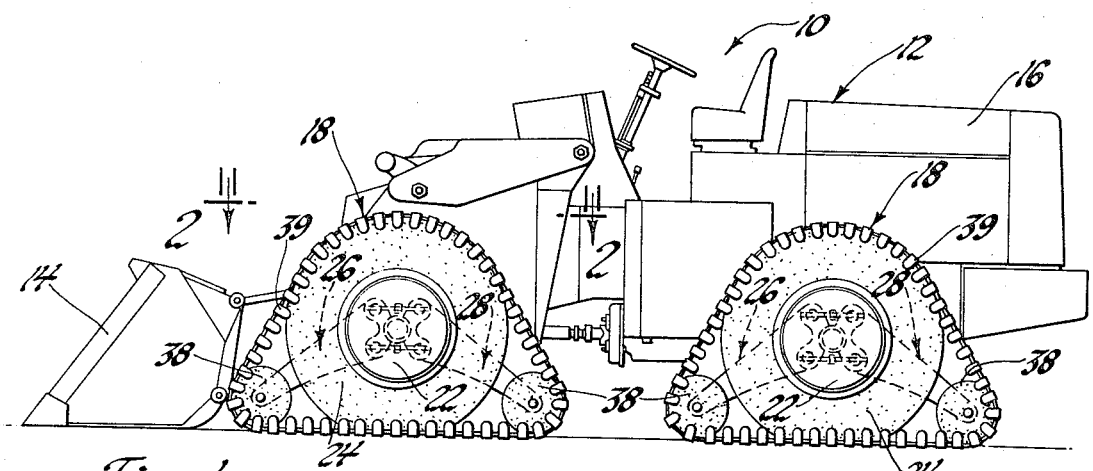
FIG. 1 is an elevational view showing a four-wheel drive tractor provided with traction devices made according to the invention.
Figure 2:
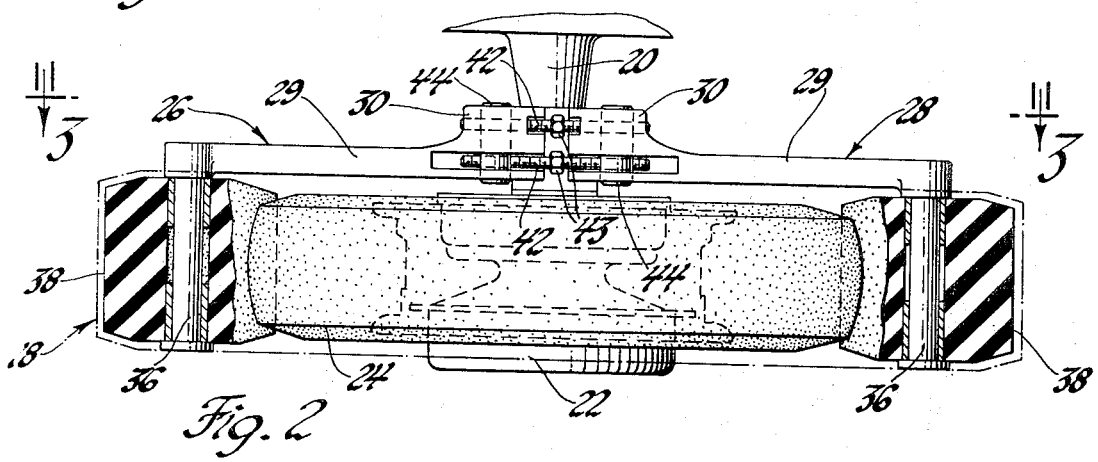
FIG. 2 is an enlarged plan view taken on line 2—2 of FIG. 1 and shows one of the traction devices incorporated with the tractor.

Referring to the drawing and more particularly FIG. 1 thereof, an off-highway front-end loader vehicle 10 is shown comprising a four-wheel drive tractor 12 which is equipped at the forward end thereof with a bucket 14. The tractor 12 is driven by the usual internal combustion engine, not shown, which is located in the rear compartment area 16 of the vehicle. The engine supplies drive through a suitable transmission and drive line to identical front and rear traction devices 18, two of which are provided on each side of the tractor. As seen in FIG. 2, it will be understood that each of the front and rear traction devices 18 is supported by a transversely extending axle housing 20 within which a suitable drive axle 21 is rotatably supported for connection with a final drive. As is conventional, the final drive consists of a planetary gear arrangement located within a final drive housing 22 which is a part of the wheel that supports a rubber pneumatic tire 24.

Figure 3:
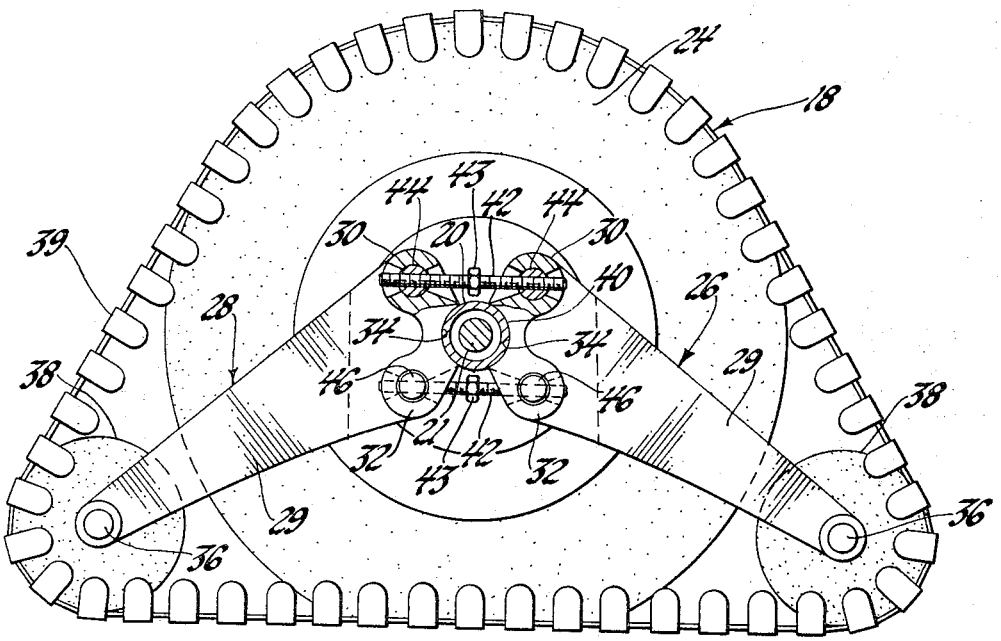
FIG. 3 is a view taken on line 3—3 of FIG. 2.

The rubber tire 24 is part of the traction device 18 made according to the invention and as seen in FIGS. 2 and 3, each traction device includes a pair of L-shaped arms 26 and 28 each of which is formed with a tapered body portion 29. The larger end of the tapered body portion 29 has a pair of vertically spaced ears 30 and 32 and a cylindrical bearing surface 34 formed thereon. The opposite or smaller end of the body portion 29 has a stub axle 36 which supports a guide roller 38 for rotation about an axis located to one side and below the rotational axis of the wheel and in longitudinal alignment with the rubber tire 24. An endless track 39 is entrained about the rubber tire 24 and the longitudinally spaced guide rollers 38. In the preferred form, the track 39 is a flexible band-type track having the inner surface thereof frictionally or otherwise engaging the periphery of the rubber tire 24 to be driven thereby.

As seen in FIG. 3 the bearing surfaces 34 of the arms 26 and 28 mate with a complementary cylindrical machined surface 40 formed on the axle housing 20 inboard of the rubber tire 24. The arms 26 and 28 are interconnected by four identical threaded stud members which are arranged in sets of two located above and below the rotational axis of the drive axle 21. An intermediate part of each stud member 42 is rigidly formed with a collar 43 which is hexagonal in cross section so as to permit the stud member to be rotated about its axis by a wrench. Both ends of each stud member are threaded with one end of being formed with right hand threads while the other end is formed with left hand threads.

Each of the upper stud members 42 is threadably received by a cylindrical pin 44 rotatably supported within each ear 30 of the arms 26 and 28. Similarly, each end of the two lower threaded stud members 42 is threadably received by a cylindrical pin 46 mounted within each ear 32 of the arms 26 and 28. Each of the pins 44 and 46 is supported by the associated ear for rotation about its longitudinal center axis.

From the above description, it should be apparent that when it is desired to decrease the amount of track in contact with the ground, the upper stud members 42 are rotated in a direction so as to cause the upper ears 30 of the arms to be drawn together and the lower stud members would be rotated in a direction so as to cause the ears 32 to be spread apart. As a result, the arm 26 is rotated clockwise about the axle housing 20 while the arm 28 is rotated in a counter-clockwise direction. Such movement provides for adjustable positioning of the guide rollers 38 with an accompanying decrease in the extent of the lower track section in contact with the ground below the rubber tire 24. Opposite rotation of the upper and lower stud members 42 would provide for movement of the arms 26 and 28 in directions opposite to those mentioned above to a point where the arms 26 and 28 will be returned about the axle housing 20 to have the guide rollers 38 located in the original positions shown in FIG. 3. In this position, the lower run of the track 39 is substantially horizontal and has the maximum amount of contact with the ground and therefore provides for improved traction and distribution of the weight of the vehicle 10. On the other hand, when one or both of the arms 26 or 28 is adjusted upwardly relative to the other as explained above, the amount of ground contact between the lower run of the track and the ground is decreased with corresponding decrease in flotation and traction ability of the traction device 18.

Various changes and modifications can be made in this construction without department from the spirit of the invention. Such changes and modifications are contemplated by the inventor and he does not wish to be limited except by the scope of the appended claims.

What is claimed is:

1. In combination with an off-highway vehicle having an axle housing extending transversely to the longitudinal axis of the vehicle, a driven wheel carried by the opposite ends of said axle housing, a rubber tire supported by said driven wheel, a pair of arms supported by said axle housing adjacent to and inboard of said rubber tire for rotation about the rotational axis of said driven wheel, each of the arms extending in a direction opposite to the other arm and having one end thereof provided with a guide roller positioned adjacent said tire and in longitudinal alignment therewith and the other end formed with vertically spaced ears, a flexible track entrained about each of said guide rollers and said tire so as to provide a substantially flat lower track section below said rubber tire for engaging the ground and serving as traction means, and means above and below said axle housing for interconnecting said ears and permitting each arm to be repositioned relative to the other arm about said rotational axis so as to vary the extent of said lower track section available for ground contact.

2. The combination set forth in claim 1 wherein said means includes a cylindrical pin rotatably mounted in each of said ears and a threaded stud member threadably received by said cylindrical pin.

3. A traction device for an off-highway vehicle having an axle housing extending transversely to the longitudinal axis of the vehicle, said traction device being carried by the one end of said axle housing and comprising a driven wheel including a pneumatic tire, a pair of arms supported by said axle housing adjacent to and inboard of said pneumatic tire for rotation about the rotational axis of said driven wheel, each of the arms extending in a direction opposite to the other arm and having a stub axle positioned adjacent said tire and in longitudinal alignment therewith, a guide roller rotatably mounted on said stub axle, a flexible track entrained about each of said guide rollers and said tire so as to provide a substantially flat lower track section below said rubber tire for engaging the ground and serving as traction means, and a pair of threaded stud members located in planes substantially parallel to said longitudinal axis and positioned above and below said axle housing for interconnecting said arms and permitting each arm to be adjusted relative to the other arm about said axle housing so as to vary the extent of said lower track section available for ground contact.

* * * * *